United States Patent [19]
Buhr et al.

[11] Patent Number: 5,300,381
[45] Date of Patent: Apr. 5, 1994

[54] COLOR IMAGE REPRODUCTION OF SCENES WITH PREFERENTIAL TONE MAPPING

[75] Inventors: John D. Buhr, Webster; Harry D. Franchino, Fairport, both of N.Y.

[73] Assignee: Eastman Kodak Company, Rochester, N.Y.

[21] Appl. No.: 950,871

[22] Filed: Sep. 24, 1992

[51] Int. Cl.$^5$ .......................... G03C 7/18; G03C 5/40; G03B 27/52
[52] U.S. Cl. ...................................... 430/30; 430/359; 430/363; 355/32; 355/40; 355/35; 355/77; 358/524; 358/513; 358/332; 358/333
[58] Field of Search .......................... 430/30, 359, 363; 355/32, 40, 35, 77; 358/78, 80, 332, 333

[56] References Cited
U.S. PATENT DOCUMENTS

| | | | |
|---|---|---|---|
| 3,977,872 | 8/1976 | Hellmig | 430/30 |
| 4,259,423 | 3/1981 | Merlo et al. | 430/30 |
| 4,792,518 | 12/1988 | Kuwashima et al. | 430/505 |
| 5,051,341 | 9/1991 | Muenter et al. | 430/359 |

OTHER PUBLICATIONS
Dr. R. W. G. Hunt; The Reproduction of Colour In Photography, Printing & Television; Fourth Edition 1987; pp. 49-66.

*Primary Examiner*—Richard L. Schilling
*Attorney, Agent, or Firm*—Francis H. Boos

[57] ABSTRACT

A system and method of image reproduction in color with preferential tone mapping in which the image reproduction is subjected to a scene parameter transformation which when taken in conjunction with untransformed characteristics of the image reproduction system and method results in a reproduced tone mapping having instantaneous gamma values of viewed reproduction density relative to density of the original scene which are greater than 1.0 and less than 1.0 plus 0.35 times scene exposure density over a scene exposure density range of from 0.6 to 1.45 as measured relative to a zero density, 100% diffuse reflector in the original scene. Preferably, the instantaneous gamma values within this scene exposure density range further lie substantially within a range of values subtended by an angle of 14° as measured from a reference point at 0.0 scene exposure density and 1.0 viewed reproduction density gradient.

8 Claims, 11 Drawing Sheets

COLOR IMAGE REPRODUCTION OF SCENES WITH PREFERENTIAL TONE MAPPING

FIELD OF INVENTION

This invention relates, in general, to the broad field of image scene reproduction in color wherein the scene may be reproduced as a reflection print by means of a print process, such as a photographic, electrophotographic, inkjet or thermal dye transfer or the like process, or as a positive transparency or as a self illuminated image, such as in the case of a video image.

BACKGROUND

The relationship between the visually perceived densities of objects in an image scene reproduction compared to those in the original scene is a critical aspect of achieving viewer satisfaction with the reproduction. Visually perceived densities of objects in an original scene or in an image reproduction of the scene include effects of viewing flare and, as is known in the art, can typically be measured using a low-flare radiometer. The theoretically correct reproduction for this purpose is generally considered to be a one-to-one relationship between the densities of the original scene and the densities of the reproduction. This is described in the book "The Reproduction of Colour" by Dr. R.W.G. Hunt, (Fountain Press, England—Fourth Ed.), specifically in Chapter 6 wherein the fundamentals of tone reproduction are discussed.

In reality however, actual tone reproduction produced by practical image reproduction systems deviates significantly from the theoretical one-to-one relationship that one might logically expect. For example, in conventional silver-halide based photographic systems, the silver-halide materials inherently tend to produce a well known non-linear, "S"-shaped relationship between the viewed print density (in the case of a print system) vs. scene exposure, such as shown on page 54 of the aforementioned Hunt reference. Similar curves are illustrated in FIGS. 1 and 2 in the accompanying drawings wherein FIG. 1 shows the D-logE curve D and its corresponding instantaneous gamma curve G representative of a typical amateur film/paper system and FIG. 2 shows the same class of curves D' and G' representative of a typical professional film/paper system. The term "instantaneous gamma" as used herein refers to the instantaneous rate of change of the image density, as perceived by the viewer, versus scene exposure density. Thus the curves G and G' correspond to the incremental slope values of the curves D and D', respectively.

It can be readily seen from FIGS. 1 and 2 that the instantaneous gamma curves of the reproduced image in both systems exhibit somewhat bell-shaped curvature in the mid-tone range with significant difference between the maximum and minimum values of the curves within the mid-tone range. The major result of this behavior in these reproduction systems is that the tone mapping of the reproduced image contains somewhat of an unnatural amplification of the mid-tone information in the image with a compression of the shadow and highlight information. The visual effect is one of a degree of harshness in the image that is recognized by the viewer as not being a natural reproduction of the original scene. It should be noted here that image reproduction of a scene that is perceived by a viewer to be a natural reproduction of the scene entails consideration of the effect that any stage in the reproduction process has on the entire process from image capture to final reproduction of the image. In U.S. Pat. No. 4,792,518-Kuwashima et al, there is disclosed a silver halide color reversal reflection print material, the purpose of which is to faithfully reproduce an original image which might exist in the form of either a transparency image or a reflection print image. This disclosure describes a method for faithfully, i.e. exactly, copying a transmission or reflection original and stresses the need for linearity in the gamma curve of the reproduction material across an extended range of original image density to achieve a faithful reproduction of the original image source (slide or print). To this extent, it is similar to the basic concept of a one-to-one relationship mentioned above in connection with the Hunt publication. Such a concept however, does not recognize or suggest what is needed to provide a natural color image reproduction of an original scene taking into account characteristics of the image capture medium and viewing flare when viewing the reproduced image. The print materials disclosed in this patent would simply reproduce whatever gamma characteristics exist in the image origination materials, which at present are distinctly non-linear, without regard to whether such materials would result in a natural reproduction of the original scene.

The challenge in image scene reproduction, therefore, is to reproduce the original scene in such a manner that upon viewing the reproduction, the viewer has the impression of looking at the original scene, that is to say, viewing the reproduction should inspire in the viewer the same response as if viewing the original scene. In this sense then, the reproduction will appear natural to the viewer even though it may not be exactly faithful to the original scene, i.e. may not be an exact measurable one-to-one density mapping relationship between the original scene and the reproduction. The result would then be a pleasing reproduction that would be preferred over reproductions that do not convey that impression.

It is desirable, therefore, to provide an image reproduction system and method that offers an overall tone mapping in the reproduced image as seen by the viewer that is perceived to be a natural reproduction of the original scene.

SUMMARY OF THE INVENTION

Thus in accordance with one aspect of the invention, a method of presenting a reproduction of an original scene with a preferential tone mapping comprises the steps of capturing original scene parameters and of creating a visual reproduction of the scene from the captured scene parameters wherein at least one of the capturing and creating steps includes a scene parameter transformation which, taken in conjunction with untransformed characteristics of the capturing and creating steps, results in a predetermined reproduced tone mapping in which instantaneous gamma values of viewed image reproduction density relative to density of the original scene is greater than 1.0 and less than 1.0 plus 0.35 times scene exposure density over a scene exposure density range of from 0.60 to 1.45 as measured relative to a zero density, 100% diffuse reflector in the original scene, the instantaneous gamma values within scene exposure density range further lying entirely within a range of values subtended by an angle of 14° measured from a reference point at 0.0 scene exposure density and 1.0 viewed reproduction density gradient.

In accordance with another aspect of the invention, a system is provided for presenting a preferential tone mapping in a reproduction of an original scene, the system being of the type having means for capturing original scene parameters onto a medium from which a reproduction of the original scene is to be derived and means for creating a visual reproduction of the scene from the captured scene parameters. The system is characterized according to the invention by at least one of the capturing and creating means including scene parameter transformation means for imparting to the visual reproduction, when taken in conjunction with untransformed characteristics of the capturing and creating means, a reproduced tone mapping having instantaneous gamma values of viewed reproduction density relative to density of the original scene which are greater than a value of 1.0 and less than a value of 1.0 plus 0.35 times scene exposure density over a scene exposure density range of from 0.60 to 1.45 as measured relative to a zero density, 100% diffuse reflector in the original scene and which further lie substantially within a range of values subtended by an angle of 14° measured from a reference point at 0.0 scene exposure density and 1.0 viewed reproduction density gradient.

DETAILED DESCRIPTION

Figure 1:
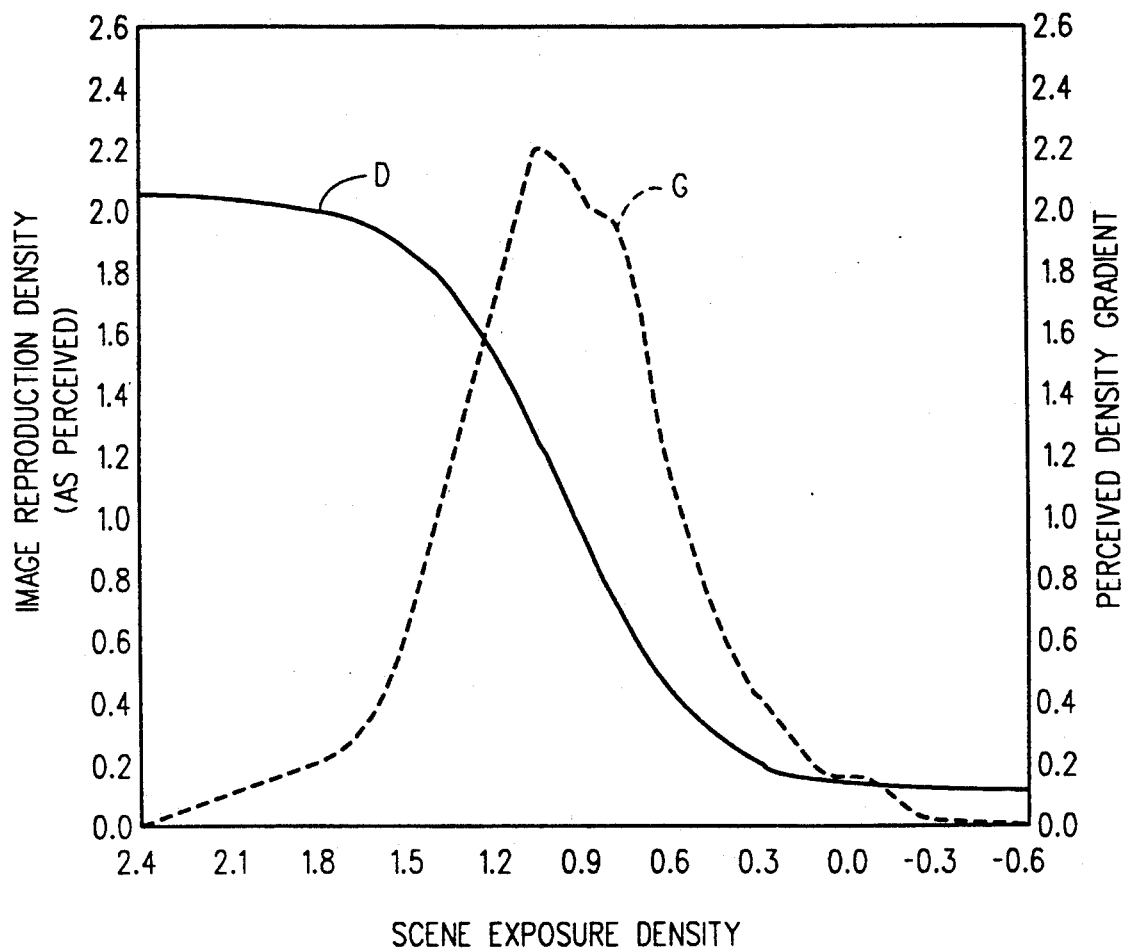
FIG. 1 is a graph illustrating image reproduction gamma and instantaneous gamma characteristics of a photographic system using conventional amateur negative film and print paper.
Figure 2:
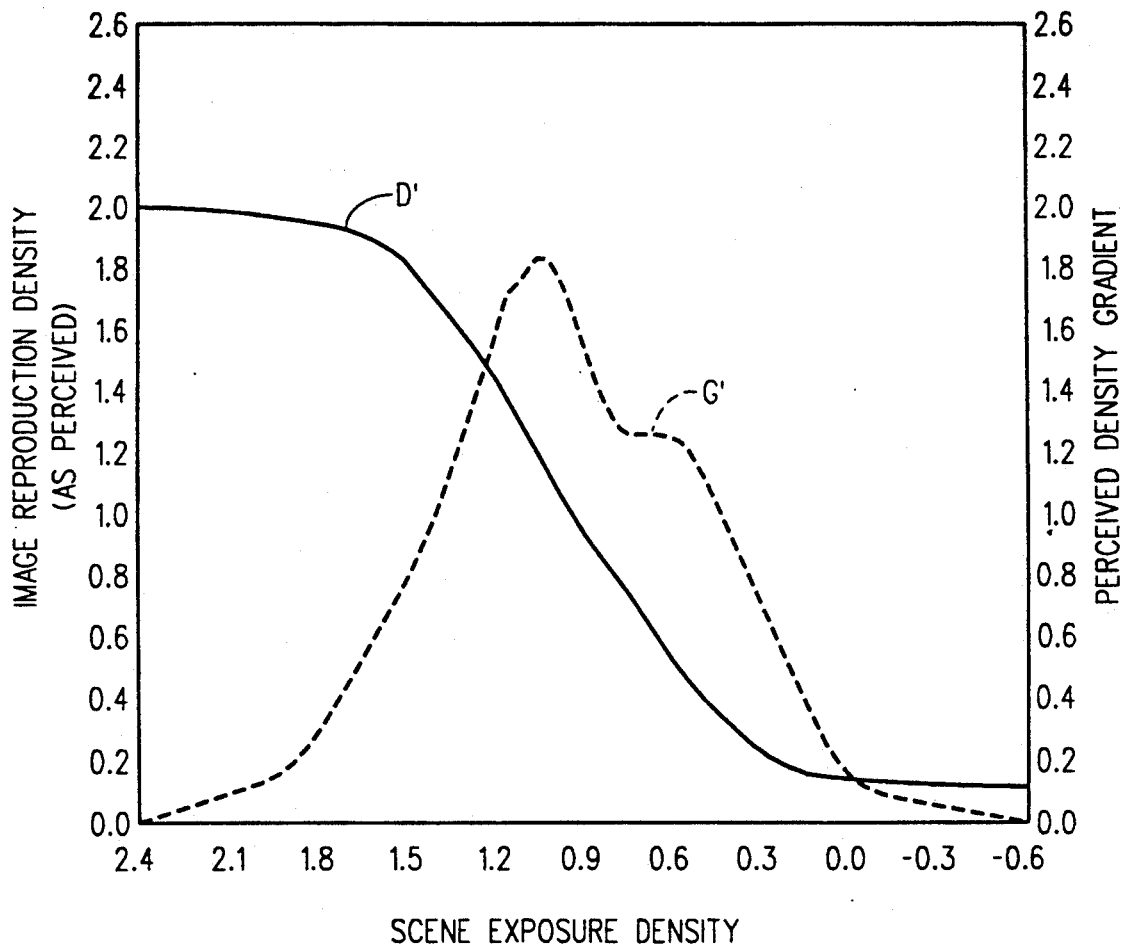
FIG. 2 is a graph similar to FIG. 1 but for conventional professional negative film and print paper.
Figure 3:
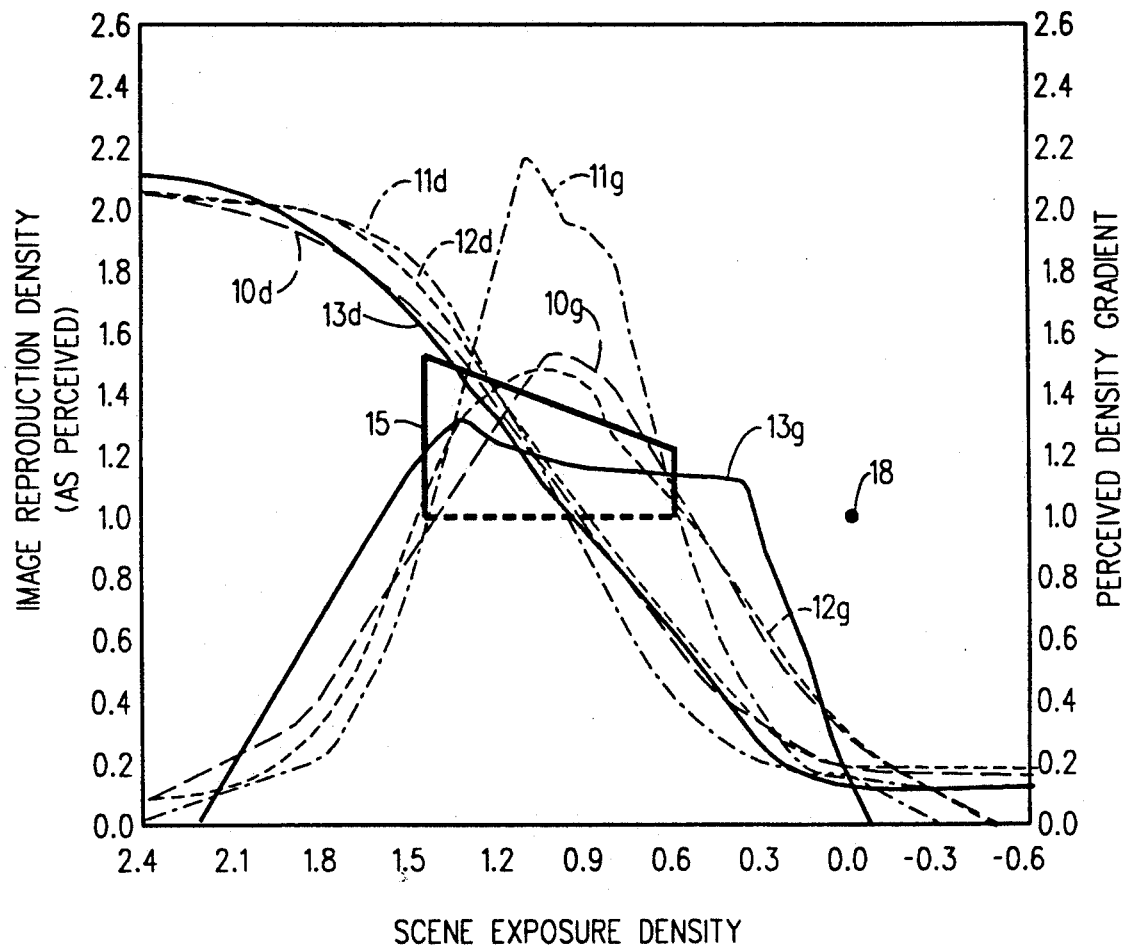
FIG. 3 is a graph similar to FIG. 1 illustrating a comparison of a variety of conventional image reproduction gamma and instantaneous gamma characteristics with the corresponding characteristics for a system and method of the present invention.
Figure 4:
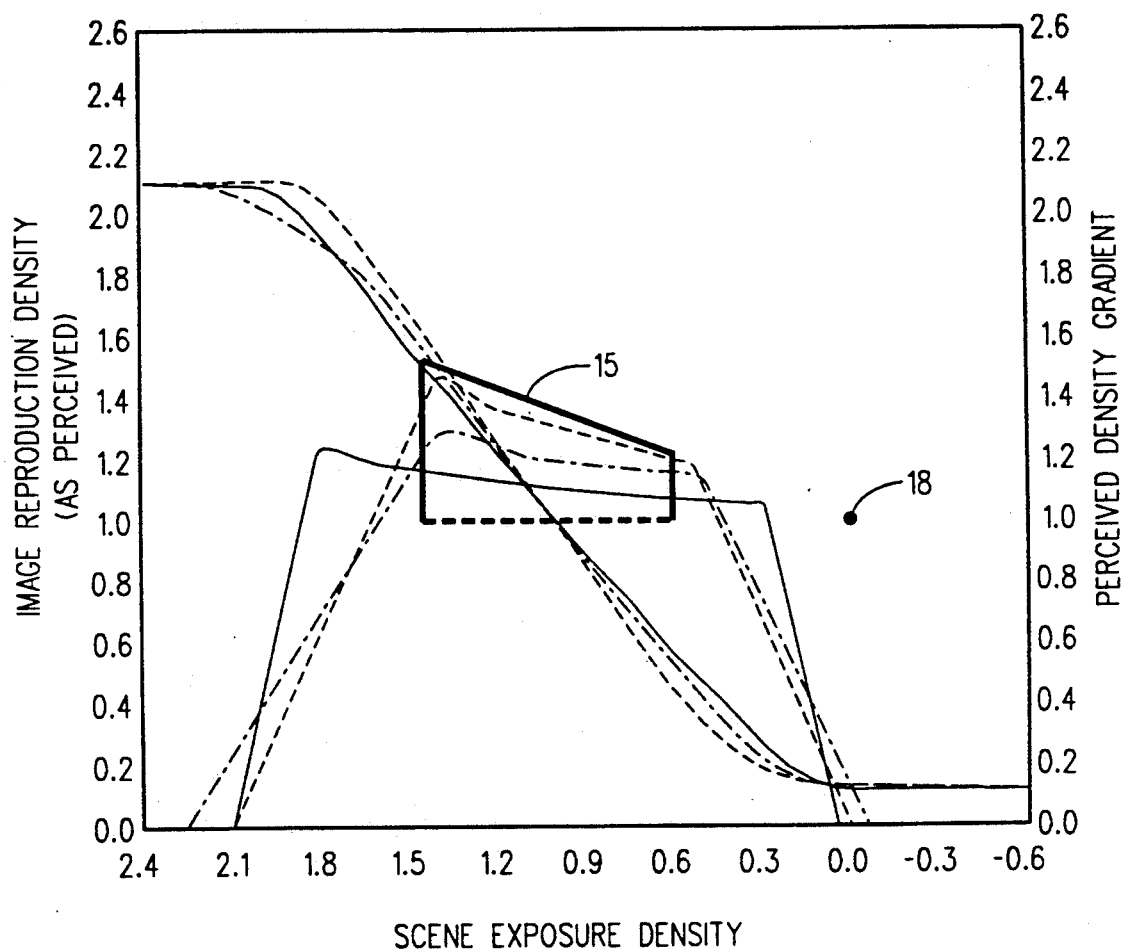
FIG. 4 is a graph illustrating scene image reproduction gamma and instantaneous gamma characteristics for a variety of image reproduction systems of the invention.

It has been found through an extensive series of empirical tests that a preferred tone mapping exists for reproduced images that provides the viewer with the perception that the reproduced image is a faithful reproduction of the original scene wherein this tone mapping matches neither the theoretical 1:1 relationship described by Hunt in the aforementioned publication nor the actual tone mapping relationship that is achieved with conventional image reproduction systems. Data developed in these tests have led to the conclusion that the best images are produced for most of a variety of scene types when the perceived densities of the reproduced image are related to the viewed densities of the original scene by an approximately linear function of instantaneous gamma over a large part of the scene density range. A comparison of representative conventional tone mappings with one example of a preferred tone mapping according to the invention is illustrated in FIG. 3 which shows a series of D-logE curves 10d–13d and corresponding instantaneous gamma curves 10g–13g for a variety of different film/paper hardcopy image reproduction systems. Curve pairs 10d,10g–12d,12g were generated from conventionally available negative film/print paper photographic systems while curve pair 13d,13g, which illustrates the preferred tone mapping, was generated using conventional negative film optoelectronically scanned to develop pixel signals which were then image-processed and printed on color print paper. The general techniques of optoelectronic image scanning, digital signal processing and digital color printing are well known and do not, of themselves require detailed discussion herein. However, the particular image transformation function employed in the digital image processing was adapted in accordance with a feature of the invention to introduce a transformation that resulted in the perceived tone mapping characteristic shown by curves 13d,13g in FIG. 3. It will be appreciated that each of the curve pairs 10d,10g through 13d,13g represent different system-dependent reproduction characteristics in which the resultant output tone mapping relative to scene input information is dependent on the functional characteristics of the materials employed in the scene reproduction process. It will also be noted that for the three systems represented by curve pairs 10d,10g through 12d,12g, the instantaneous gamma curves 10g–12g are substantially bell-shaped in the mid-tone rage with significant variation between the maximum and minimum values of the curves within the mid-tone range. The mid-tone range, for this purpose can be seen to extend from about 0.6 to about 1.45 relative to a zero density, 100% diffuse reflector in the original scene. This reference reflector is represented in the graph of FIG. 3 by point 18 at the intersection of zero exposure density and 1.0 image reproduction density gradient and is commonly referred to in the art as a reference of 100% white in the scene. By comparison with the conventional systems, however, the instantaneous gamma curve 13g for the system of the invention is more flat, without the bell-shaped characteristic, approaching that having a nearly horizontal, linear segment in this same mid-tone range of scene exposure densities of from about 0.6 to about 1.45 relative to 100% white in the scene. While a single system according to the invention, as represented by curves 13d,13g, is illustrated in FIG. 3, it has been found through the aforesaid empirical tests that perceived natural image reproduction is achieved by systems that exhibit values of instantaneous gamma falling within a range of output densities, albeit fairly limited in extent, as is graphically indicated in FIG. 3 by trapezoidal outline 15. This graphically illustrated range of instantaneous gamma values can be described in quantitative terms as being a range of values of viewed reproduction density gradient relative to density of the original scene which are greater than 1.0 and less than 1.0 plus 0.35 times scene exposure density over a scene exposure density range of from about 0.60 to about 1.45 as measured relative to a zero density, 100% diffuse reflector in the original scene. In FIG. 4, a number of instantaneous gamma functions according to the invention are shown which fall within this described range and which have been found to give preferred perceived image reproduction for a wide variety of scene types.

Figure 6:
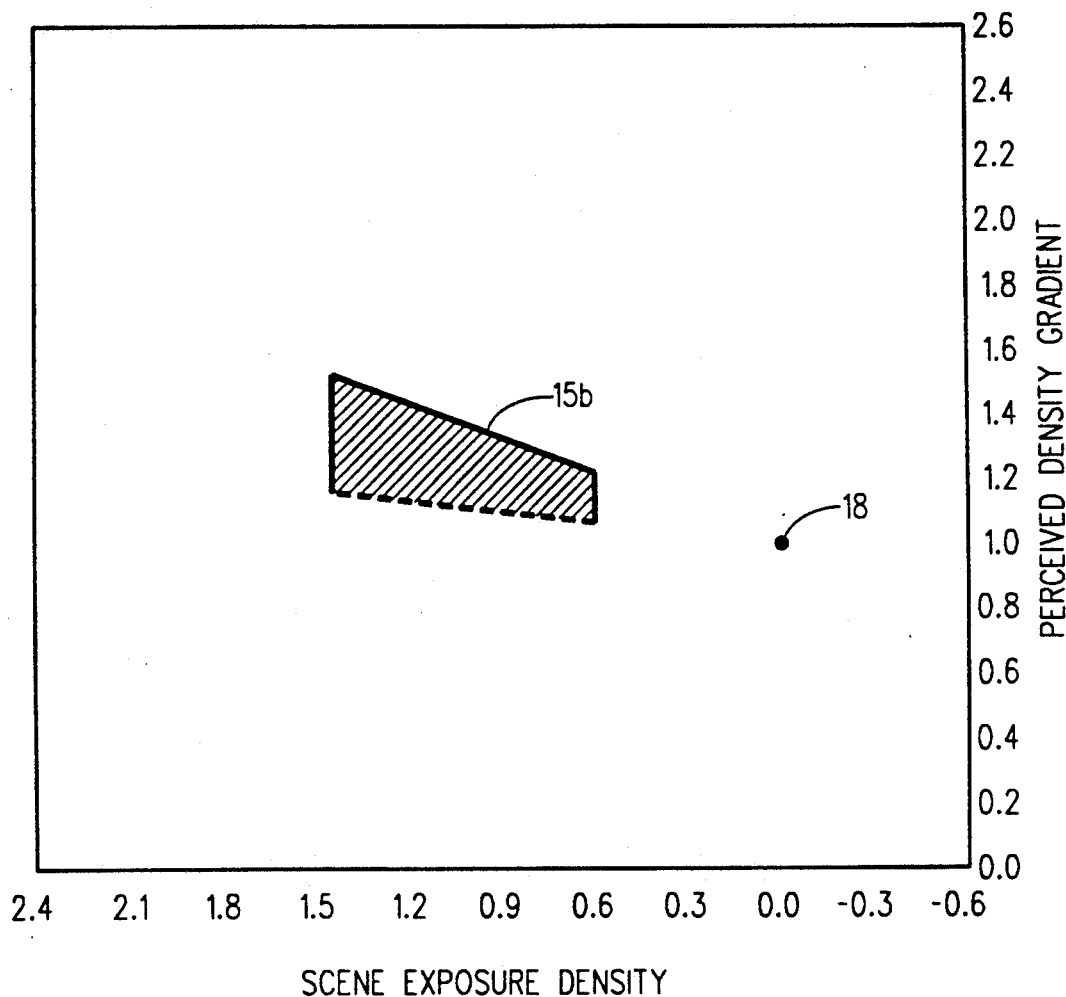
Figure 7:
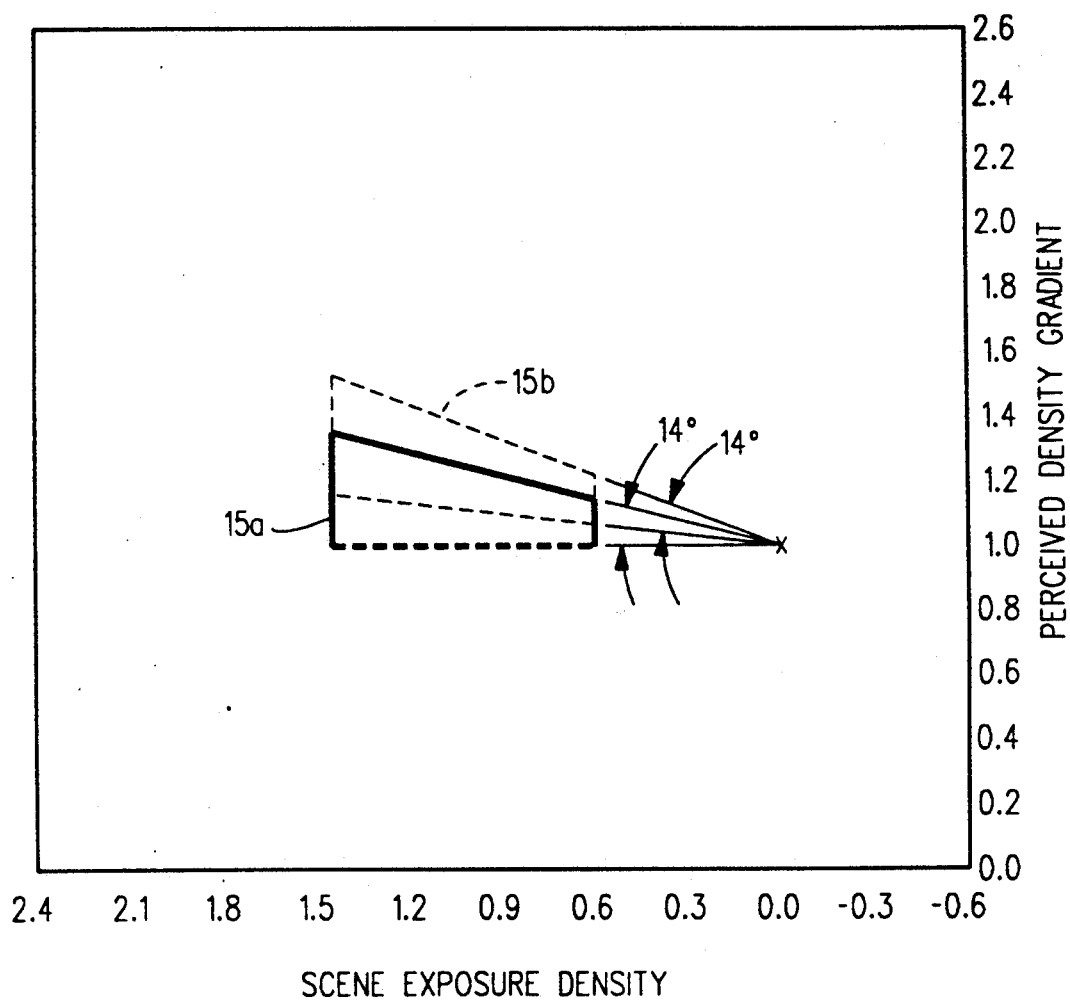

It has been found that, for most scenes, preferred image reproduction results in gamma functions that fall within the lower portion of the range 15. This range of preferred gamma function is illustrated by trapezoid 15a in FIG. 5 and may be described quantitatively as being viewed reproduction density gradient values greater than 1.0 and less than 1.0 plus 0.25 times scene exposure density in the range of scene exposure density of from 0.6 to 1.45 measured against the 100% white as described above. For some scenes, however, it has been discovered that a slightly modified range of instantaneous gamma values give preferred images. Scenes of the latter type are generally scenes which have limited contrast range such as low light scenes; a dusk scene or a foggy scene being typical examples. For scenes of this type, preferred instantaneous gammas would fall in the upper portion of the range 15 in FIG. 4 and as illustrated specifically in FIG. 6. While these latter instantaneous gammas are slightly higher overall than for the "most scene" range of instantaneous gammas shown in FIG. 5, the included range of values in each boundary set is approximately the same. Thus further in accordance with the invention, the range of acceptable gamma values within the aforementioned mid-tone range may be further defined as lying entirely within a range of output density values subtended by an angle of about 14° measured from the 100% white reference point 18. This is illustrated in FIG. 7 in which the solid line trapezoid 15a represents gamma range boundary conditions that provide preferred viewed image reproduction for "most scenes" case while the dotted line trapezoid 15b is applicable to low contrast scenes. In each case, as can be seen, the angle subtended by the trapezoidal area is indicated as being 14°. While 14° is indicated as the preferred boundary condition, it will be appreciated that some limited deviation from this precise figure is possible. Techniques and apparatus for film image classification in photofinishing processes are well known. Thus, it is within the scope of the invention to provide for image classification, for example in film scanner apparatus 24, to identify images which are best reproduced with the instantaneous gamma characteristic 15a and other scenes, notably low contrast scenes, which are best reproduced with the instantaneous gamma characteristic 15b. Other scene classifications can be envisioned that would preferably use an instantaneous gamma characteristic range as described above other than 15a or 15b but nonetheless falling within the overall boundaries of trapezoid 15. Knowing the image classification, the appropriate lookup table in image processor 26 would then be employed to achieve the desired resultant instantaneous gamma characteristic in the image reproduction.

Up to this point, the invention has been described with emphasis on the nature of the instantaneous gamma function of the viewed image reproduction. This is due in large part to the fact that the phenomenon of natural reproduction of an original scene involves a knowledge and understanding of the manner in which scene parameters are affected by each step in the process of scene capture and image reproduction. With this newly discovered knowledge of what constitutes preferred natural image reproduction, it then becomes possible to direct the adjustment of any one or more of the stages in the overall process to achieve the desired result of natural image reproduction which is best characterized in a quantitative manner by the instantaneous gamma function definitions set forth above. With this knowledge, many methods and corresponding systems can be formulated to achieve this result. Some examples of such systems will now be considered.

Figure 8:
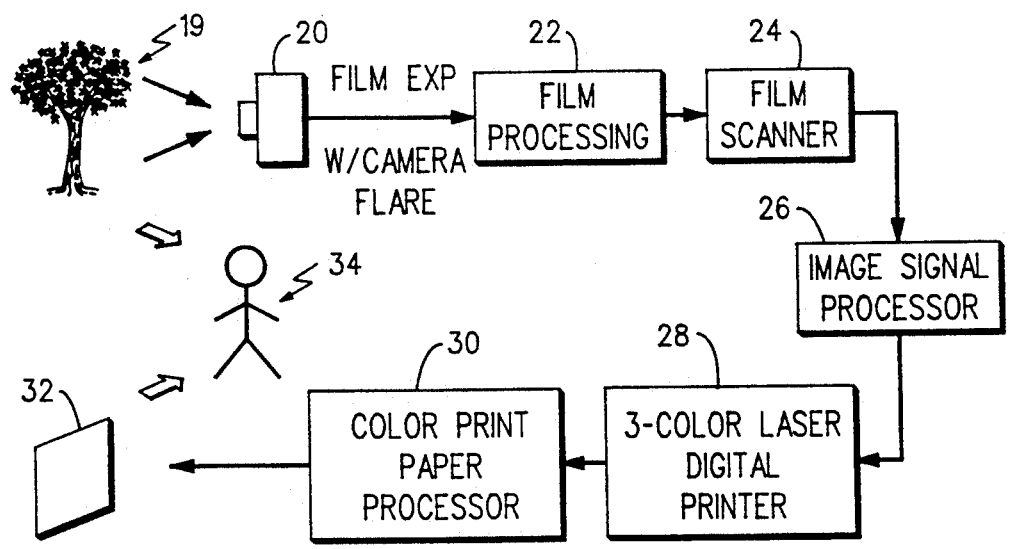
FIG. 8 is a schematic representation of a scene image reproduction system in accordance with the system and method of the present invention.
Figure 9:
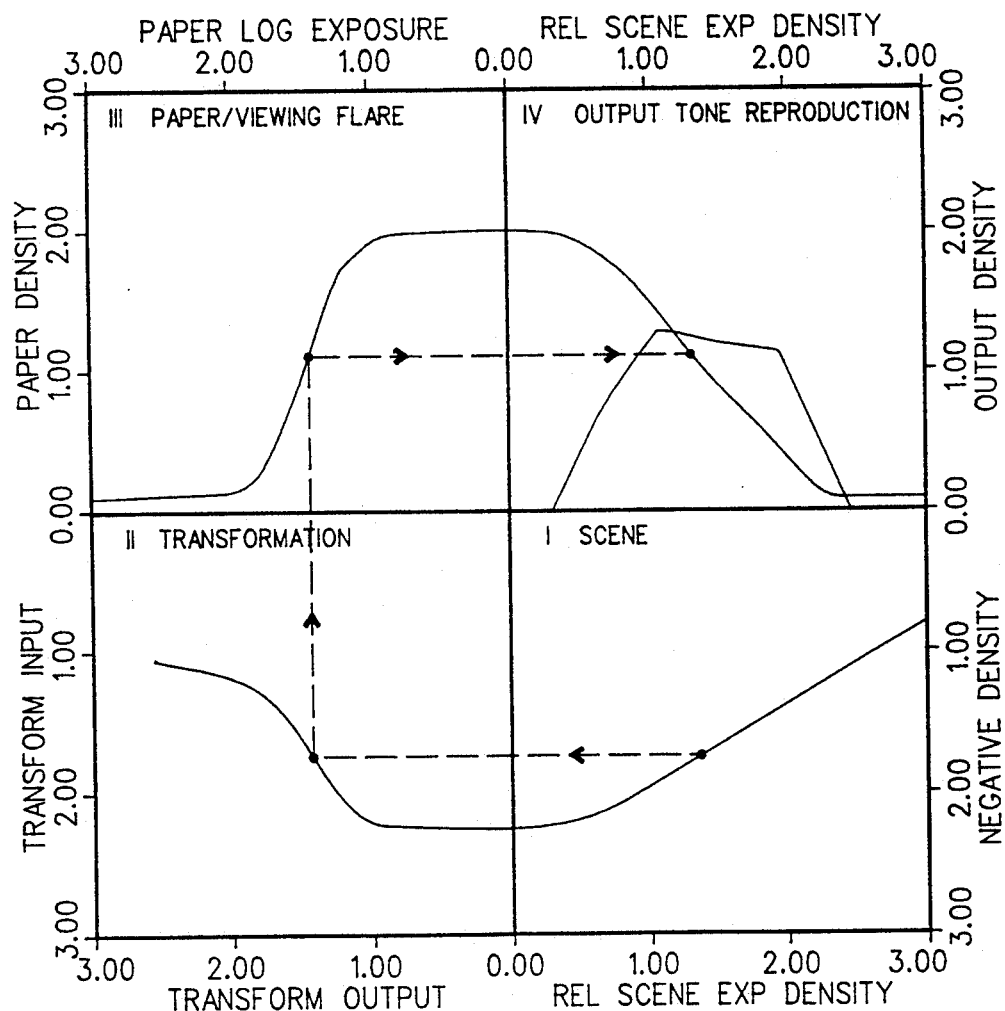
FIG. 9 is a four quadrant tone reproduction diagram for the system of FIG. 7.

Referring to FIG. 8, an example image reproduction system is shown which incorporates provision for producing the preferred tone reproduction images in accordance with the present invention. In this system, a conventional single lens reflex camera 20 may be used to capture a scene 19 on conventional ISO 100 color negative film (not shown) This film is then processed in known manner in a film processor 22 to produce a negative film image having a D-logE characteristic curve 40 illustrated in Quadrant I of the four quadrant tone reproduction diagram of FIG. 9. It will be appreciated by those skilled in the art that the film D-logE curve 40 includes the effects of the cameraexposing flare introduced by virtue of light scatter in the camera and taking lens Typically, the film from the processing stage would then be directly printed at the photofinishing lab using a printer and a color print paper processor 30 to produce a hardcopy color print 32 The transfer function of such conventional print production might typically be represented as shown in Quadrant III of FIG. 9. Desirably, the print 32 should appear to a viewer 34 as a preferred natural reproduction of scene 18 However, assuming the scene capture medium, as represented by the camera and film characteristics of Quadrant I, and the image reproduction medium, as represented by the printer and paper characteristics of Quadrant III, are all conventional, the resultant D-logE and corresponding instantaneous gamma function will typically appear as shown by one of the conventional curve pairs 10d,10g-12d,12g of FIG. 3. In other words, the instantaneous gamma function for the image reproduction would have substantial portions lying outside the preferred trapezoidal tone mapping range within the boundaries of trapezoid 15. However, even with the photographic system such as just described involving conventional film and paper processing, it is possible to shape the resultant D-LogE and corresponding gamma function curves of Quadrant IV by providing a predetermined digital or analog transformation function, as represented in Quadrant II, which, taken in conjunction with the conventional transfer functions of Quadrants I and III, will achieve the desired output function of Quadrant IV. Thus, to this end in the embodiment of FIG. 8, the developed film is applied to a film scanner 24 in which the image is converted to a series of image pixel signals, the amplitude value of each pixel signal being related to the density of the corresponding pixels in the film image The image pixel signals are then applied to an image signal processor 26 wherein the image pixel signals are modified in accordance with the predetermined transformation characteristic of Quadrant II and fed to an appropriate printing device such as a three color laser printer used to expose the photographic paper prior to being processed in processor 30. Preferably, the scanned pixel signals are converted to digital form in known manner, either in the scanner 24 or the signal processor 26, to simplify the signal modifying processing function in the processor 26. Since the transfer characteristics of the scene capture and image reproduction media are easily measured and generally well known, it is a fairly straightforward matter utilizing known techniques in the art of digital image processing to establish the intermediate transfer function of Quadrant II in the form of a lookup table in the digital processor 26 to achieve the desired results. The advantage of using digital image processing as just described is the ability to achieve the preferential tone mapping of the invention using image capture and image reproduction media which do not inherently have the desired transformation functions. Alternatively, it possible to embody the desired transformation function within the material of either the image capture stage, e.g. the photographic film or within the image reproduction stage, e.g. the photographic print paper, in the case of photographic reproduction systems. It is also possible to share the transformation function within both the image capture and image reproduction stage as might be the case, for example, where matched film and paper media are employed.

Figure 10:
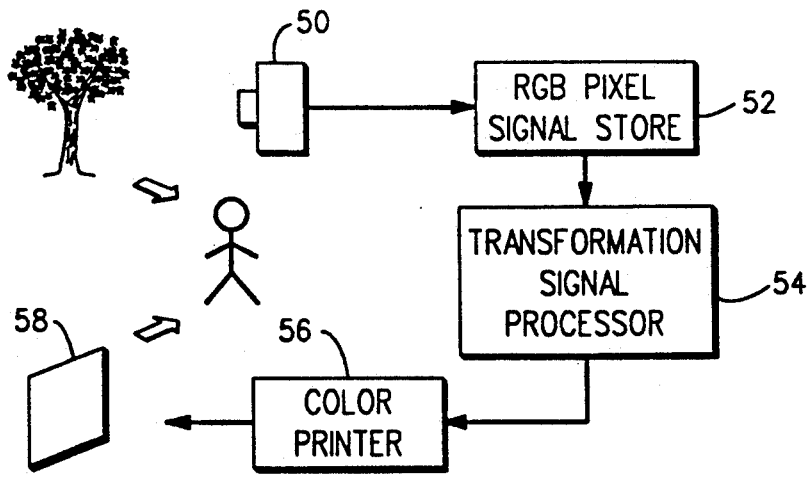
FIG. 10 is a schematic representation of an alternative scene image reproduction system in accordance with present invention.
Figure 11:
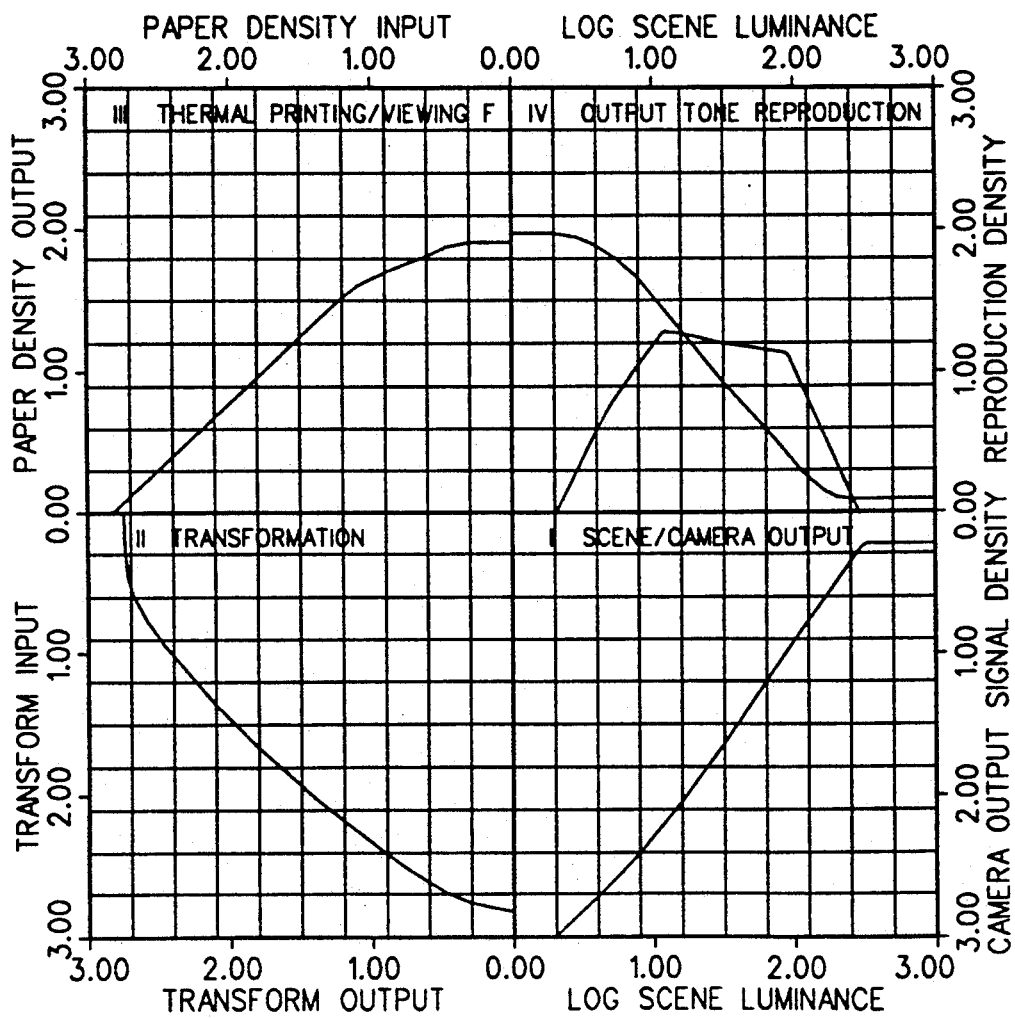
FIG. 11 is a four quadrant tone reproduction diagram for the system of FIG. 9.

FIG. 10 illustrates an alternative system involving a purely electronic image capture system including an electronic camera 50 and an RGB image signal store 52. In a system, of this type, the image is typically captured directly in the form of image pixel signals which may then be manipulated in an image signal transformation processor 54, in accordance with the invention, using an appropriate lookup table to modify the image signals according to the transfer function of Quadrant II in FIG. 11. The modified signals are then applied to a conventional color printer 56 where the image is printed directly in hardcopy, form in known manner using thermal dye transfer, inkjet processes or laser printing or the like The transfer function of Quadrant I corresponds to the conventional transfer function of the scene capture stage, including camera 50, and the transfer function of Quadrant III corresponds to the conventional transfer function of the image reproduction stage, including printer 56. It will be appreciated, however, that the image processor transfer function modification of Quadrant II can also be incorporated into either the scene capture stage or the image reproduction stage thus modifying the corresponding transfer function of Quadrant I or Quadrant III, respectively, such as was described in respect to the photographic system of FIG. 8.

Figure 12:
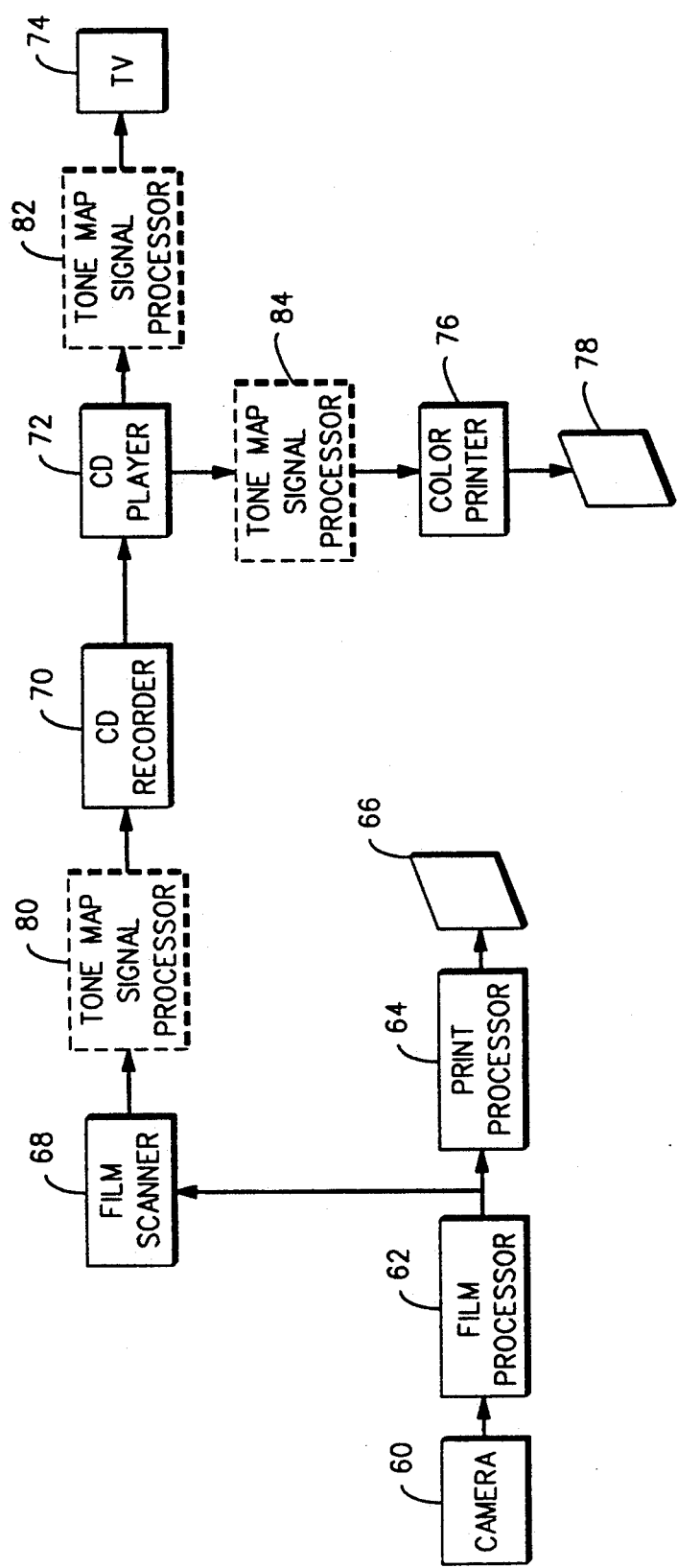
FIG. 12 is a schematic representation of an scene image reproduction system incorporating digital image storage on a compact disc and illustrating alternative configurations in which the present invention might be practiced.

Referring now to FIG. 12, there is shown an image reproduction system of the hybrid type involving capability for both photographic and electronic image reproduction. A system of this type, as represented by the solid line functional blocks, has been introduced by the Eastman Kodak Company under the name of Photo-CD and is capable of providing reproduced images in a variety of formats such as by means of photographic prints and video images on the screen of a television cathode ray tube. As illustrated in FIG. 12, a photographic camera 60 is used to expose film which is submitted to a photographic lab where it is developed in a film processor 62 and applied to a print processor 64 for the production of photographic prints 66. In accordance with the principals of the aforementioned Photo-CD process, the film negatives may also be applied to a film scanner 68 for generation of image pixel signals which are converted to digital form for recording on an intermediate signal recording medium such as an optical recording compact disc (not shown) by means of a CD recorder 70. The film negatives, prints and compact disc are then furnished to the customer. Assuming the customer has an appropriate CD player 72 connected to a television set 74, the images recorded on the disc can be played back through the TV set for viewing, and manipulating in a number of ways, such as zooming, cropping etc. Alternatively, the image signals output from the CD player 72 may be applied to a hardcopy printer 76, which may, for example, comprise a thermal dye transfer color printer, for the production of color prints 78 in the home with or without manipulation of the prints, i.e. zooming, cropping etc.

In accordance with the invention, the tone mapping in the output reproduced image may be accomplished by modifying the image pixel signals as described above using a signal processor 80 at the output of the film scanner 68 in the photographic lab prior to recording of the signals on the compact disc or by means of a signal processor 82 or 84 at the output of the disc player 72. In practice, the processors 82 and 84 might be the same with provision for selection of the appropriate lookup table for the desired transfer function depending on whether tone mapping adapted for the thermal printer or for the video image produced in the TV set 74 is to be employed. Adaption for images reproduced on a self-illuminated image reproduction device such as a TV cathode ray tube would be required due to the well known effect that the surround has on a viewer's perception of the image being viewed. This would be accommodated in the video image by shifting the boundary conditions and the 100% scene white reference point of FIGS. 5-7 by +0.1 density gradient units to thereby produce equivalent parameters for the TV image. In a similar vein, it will be appreciated that projected images, slide projections or video image projections, are generally viewed in relatively darkened surround conditions and equivalent parameters for projected images would be arrived at by shifting the boundary conditions and 100% white scene reference point of FIGS. 5-7 by +0.3 density gradient units.

Figure 13:
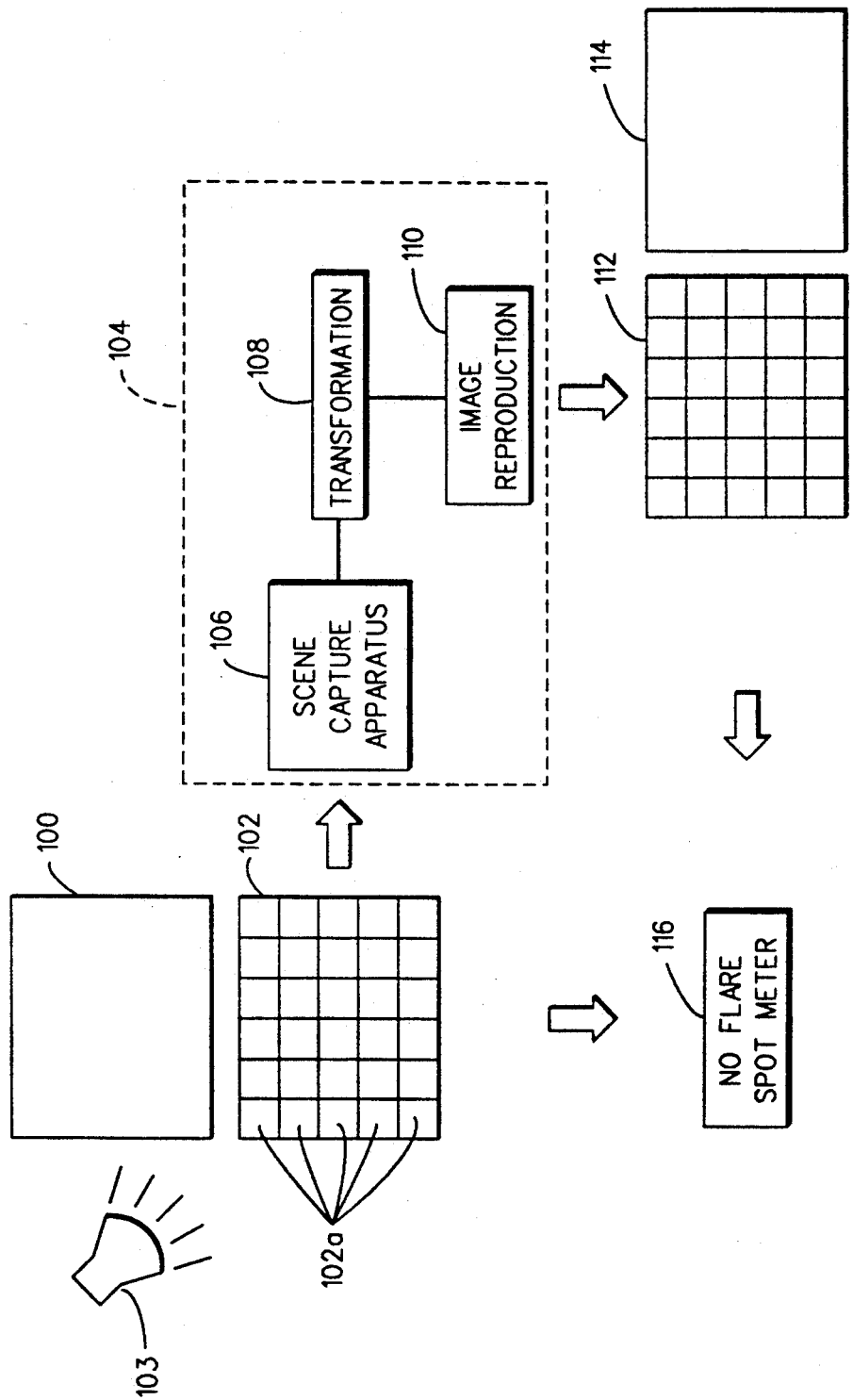
FIG. 13 is a schematic illustration of a test arrangement for mapping tone reproduction of a scene image reproduction system.

A test procedure for determining the tone reproduction of an image reproduction system in the case of hardcopy reflection prints will be described in reference to FIG. 13. In this test procedure, two test targets 100, 102 of uniform size are provided. Target 100 is a spectrally uniform gray, i.e. exhibits constant percent reflectance (20%) in a wavelength spectrum of from 380 nm to 780 nm. Target 102 is the same as target 100 except for the provision of a series of uniform gray stepped density areas 102a spanning the range from approximately 0.0 optical density (100% lambertian diffuser) to 1.80 optical density in increment of 0.10 or finer. Each density step is spectrally uniform and is large enough to allow for easy measurement. Both targets are large enough so that when photographed as described below, each target substantially fills the image capture area of the capture device.

A lighting system 103 is provided to uniformly illuminate the targets, mounted on a uniform gray (20% reflectance) background, at approximately a 45° angle of incidence. The lighting should provide reasonably specular illumination typical of high quality, low flare viewing conditions. The spectral quality of the lighting should be similar to that for which the imaging system under test is designed. Under constant illumination conditions from lighting system 103 and with a scene capture apparatus 106, e.g. a photographic camera, oriented perpendicularly to the targets, each of the target images is captured according to ISO standards for the image capture device. Additionally, the absolute visual densities of each density step in target 102 and the corresponding area of target 100 are measured using a very low flare radiometer. Each measurement is made with a spot size one-fourth as large as the density step area being measured. Using identical lighting, image device and radiometer conditions, target 100 is captured and measured as described above.

Using the imaging system 104 under analysis including scene capture apparatus 106 and image reproduction stage 110 and having an overall transformation characteristic represented by transformation box 108, a hardcopy reproduction of the target images is produced by image reproduction stage 110. The reproduction is made in such a manner that a 1.0 scene density relative to a 100% diffuse reflector is reproduced at a density of 1.0.

Figure 5:
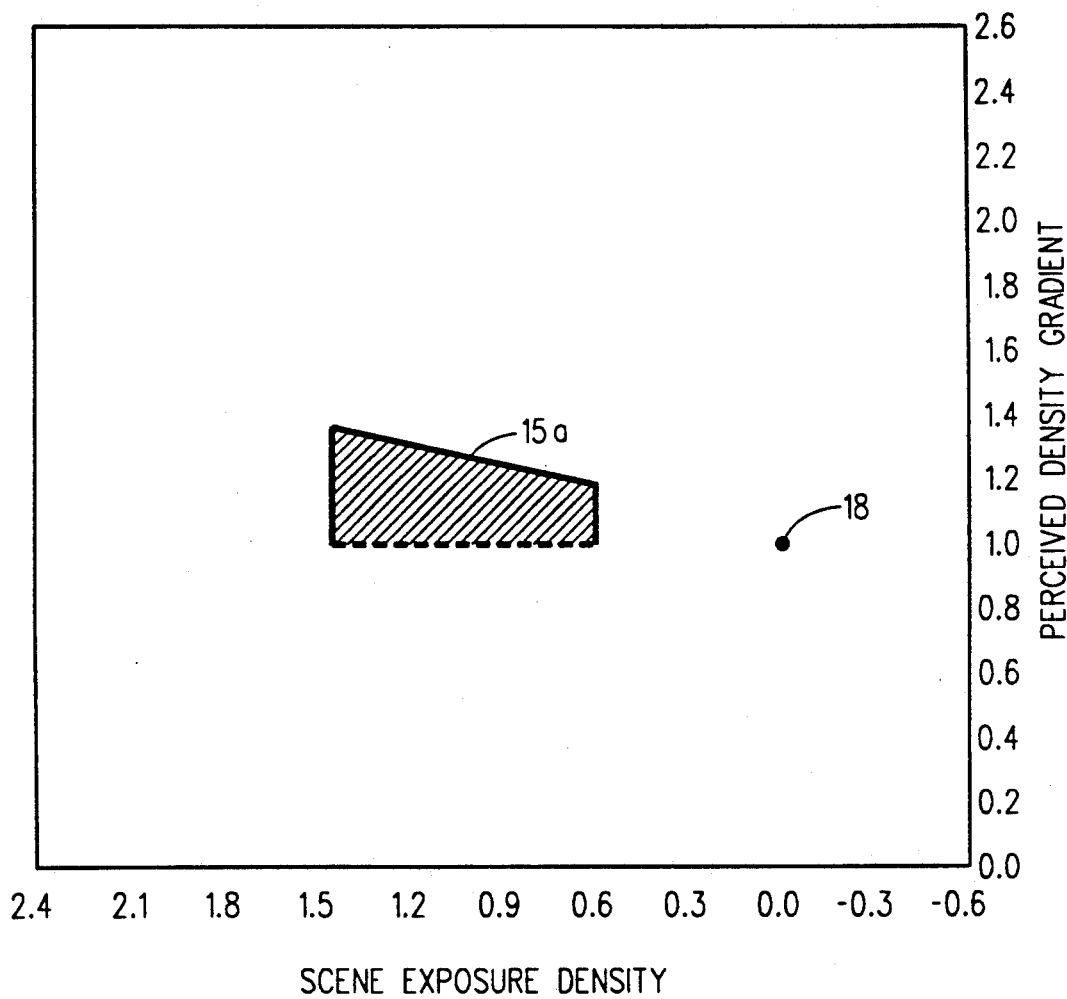
FIGS. 5–7 are graphs of boundary conditions for scene image reproduction instantaneous gamma characteristics that are useful in explaining and defining the parameters of the present invention.

The reproduced prints are uniformly illuminated with lighting system 103 at a 45° angle of incidence and the visual step densities are measured with the very low flare radiometer 116. It will be appreciated that the targets and reproductions preferably are illuminated and measured under identical conditions. After correcting the measured step densities on the target 102 for any target illumination non-uniformity using the target 100 densities in the same location as the target 102 steps and after correcting the measured step densities on target 112, the reproduction of target 102, for any target illumination non-uniformity, any field exposure non-uniformity by the scene capture apparatus 106 onto the film or sensor and any field exposure non-uniformities present in the hardcopy image reproduction apparatus 116 using target 114, reproduction of the target 100, densities in the same location as the target 102 steps and using the print through tone reproduction D-LogE function, the measured hardcopy step density versus the target step density function are plotted on a density versus scene density graph along with the instantaneous gamma of this curve. This is preferably done by accurately fitting the data points with a mathematical spline function to obtain the D vs LogE curve and calculating the first derivative of the fitted curve to get the instantaneous gamma function. The resulting plotted functions are then observed and analyzed as shown in FIGS. 5-7.

To test the tone reproduction of video images or projected images viewed in darkened environments, the targets are captured and measured as described above. The images are then reproduced as the intended video or projected images and then measured with a radiometer as described above except using the viewing environment typical for image viewing for the system being tested with no additional lighting. Correction are then applied for the display hardware field non-uniformity using the photographed (captured) gray target. Plotting and analysis of the resulting D-LogE and instantaneous gamma functions then proceeds as described above except comparison to the parameter of the invention are made using the equivalent adjusted boundary conditions and 100% scene white point as described earlier.

The invention has been described in detail with particular reference to a presently preferred embodiment, but it will be understood that variations and modifications can be effected within the scope of the invention as set forth in the appended claims.

What is claimed is:

1. A method of presenting a reproduction of an original scene in color with a preferential tone mapping, the method comprising the steps of capturing original scene parameters and creating a visual reproduction of the scene from the captured scene parameters; the method characterized by:

performing a transformation on said captured scene parameters, said transformation being such that, taken in conjunction with untransformed characteristics of the capturing and creating steps, results in a reproduced tone mapping having instantaneous gamma values of viewed reproduction density relative to density of the original scene which are greater than a minimum value of 1.0 and less than a maximum value of 1.9 plus 0.35 times scene exposure density over a scene exposure density range of from 0.60 to 1.45 as measured relative to a zero density, 100% diffuse reflector in the original scene and which further lie substantially within a range of values subtended by an angle of 14° measured from a reference point at 0.0 scene exposure density and 1.0 viewed reproduction density gradient.

2. The method of claim 1 wherein said capturing step comprises exposing said original scene parameters onto photographic film having said scene parameter transformation embodied in the film.

3. The method of claim 1 wherein said creating step comprises reproducing said scene on media to be viewed, said media having said scene parameter transformation embodied therein.

4. The method of claim 3 in which said media is to be viewed by reflection.

5. The method of claim 4 in which said media consists of silver halide based photographic print paper.

6. The method of claim 1 in which said capturing step comprises exposing original scene parameters onto photographic film and wherein said method further comprises the steps of (a) optoelectronically scanning said film to produce image pixel density-representative signals and (b) adjusting the amplitudes of said pixel signals in accordance with said scene parameter transforming.

7. The method of claim 6 wherein said pixel signals after transformation are applied to one or more types of viewable output media for creation of said visual reproduction, said output media types comprising (a) non-silver-halide-based photographic reflection print paper, (b) silver-halide-based photographic reflection print paper, (c) self-illuminated image reproduction device and (d) transparent or semi-transparent transmission media.

8. The method of claim 1 wherein different regions of preferential tone mapping of said instantaneous gamma values subtended by said angle exist between said minimum and maximum values and said creating step includes a step of classifying said scene to be reproduced and a step of selecting a region of said instantaneous gamma according to the classification of said scene to be reproduced.

* * * * *

UNITED STATES PATENT AND TRADEMARK OFFICE
CERTIFICATE OF CORRECTION

PATENT NO. : 5,300,381
DATED : April 5, 1994
INVENTOR(S) : John D. Buhr et al.

It is certified that error appears in the above-indentified patent and that said Letters Patent is hereby corrected as shown below:

Col 10, line 21, delete "1.9" and insert --- 1.0 ---.

Signed and Sealed this

Thirteenth Day of September, 1994

Attest:

BRUCE LEHMAN

Attesting Officer      Commissioner of Patents and Trademarks